United States Patent [19]

Tiefenthaler et al.

[11] 4,162,925

[45] Jul. 31, 1979

[54] PHOSPHATED LOCUST BEAN GUMS

[75] Inventors: Karl H. O. Tiefenthaler; Erich W. K. Nittner, both of Kreuzlingen, Switzerland

[73] Assignee: Meyhall Chemical AG, Kreuzlingen, Switzerland

[21] Appl. No.: 904,689

[22] Filed: May 10, 1978

[51] Int. Cl.$^2$ .................................................. C08L 5/00
[52] U.S. Cl. .................................. 106/208; 252/316; 536/114
[58] Field of Search ................ 536/114, 117; 106/205, 106/208; 252/316

[56] References Cited

U.S. PATENT DOCUMENTS

| | | | |
|---|---|---|---|
| 2,575,352 | 11/1951 | Lohmar | 536/103 |
| 2,801,242 | 7/1957 | Kerr et al. | 536/109 |
| 2,824,870 | 2/1958 | Neukom | 536/48 |
| 2,865,762 | 12/1958 | Neukom | 536/109 |
| 2,884,412 | 4/1959 | Neukom | 536/109 |
| 2,884,413 | 4/1959 | Kerr | 536/106 |
| 2,938,901 | 5/1960 | Kerr et al. | 536/109 |
| 2,961,440 | 11/1960 | Kerr et al. | 536/107 |
| 2,971,954 | 2/1961 | Kodras | 536/109 |
| 3,046,272 | 7/1962 | Strating | 536/109 |
| 3,284,443 | 11/1966 | Hay et al. | 536/109 |
| 3,467,647 | 9/1969 | Benniga | 106/205 X |
| 3,507,664 | 4/1970 | Shuppner | 99/139 |
| 3,519,434 | 7/1970 | Schuppner | 99/107 |
| 3,557,016 | 1/1971 | Schuppner | 252/316 |
| 3,659,026 | 4/1972 | Schuppner | 424/361 |
| 3,748,201 | 7/1973 | Jordan | 536/114 |
| 4,038,206 | 7/1977 | Karl | 106/205 |

OTHER PUBLICATIONS

Industrial Gums, Whitsler et al., 1973 pp. 331, 332.
Encyclopedia of Polymer Science & Tech., vol. 12, pp. 835 & 836, and vol. 10 pp. 135.

*Primary Examiner*—Theodore Morris
*Attorney, Agent, or Firm*—Herbert P. Price; K. A. Genoni; T. J. Morgan

[57] ABSTRACT

Phosphated locust bean gum is cold water soluble and does not require heat or high shear to form viscous solutions in water. Blends of phosphated locust bean gum and xanthan gums are also cold water soluble and such blends will form highly viscous gels in water without the application of heat or high shear agitation. Such gels are useful as suspending media for a variety of materials, e.g., seeds used in fluid drilling planting operations.

10 Claims, No Drawings

PHOSPHATED LOCUST BEAN GUMS

BACKGROUND OF THE INVENTION

The field of art to which this invention pertains is derivatives of carbohydrate gums and particularly, organic gels of such carbohydrate gum derivatives.

Natural and synthetic gums have been used as thickeners for foods, coatings, paints, explosive slurriers, oil well fluids and many other applications. One such natural gum which has found many applications as a thickener is locust bean gum, or carob bean gum as it is also known. One limitation in the use of locust bean gum is its limited solubility and viscosity increase in cold water, i.e., water at 25° C. or below. Although the solubility and viscosity increase with increasing temperature, a minimum temperature of about 86° C. is required to obtain maximum solubility and viscosity. Upon cooling, the solubility and viscosity of the locust bean gum solutions are retained.

As described in U.S. Pat. No. 3,557,016, heat reversible gels are obtained from a blend of locust bean gum and xanthan gum. These gels are made by adding a mixture of the locust bean gum and xanthan gum to hot water and, thereafter, cooling, or by adding the mixture of gums to cold water and mixing under high speed agitation. Generally such gels are obtained by adding the mixture of gums to hot water in the temperature range of about 66° C. to about 82° C. and holding the components in this temperature range for about 15 minutes. The crosslinking reaction between locust bean gum and xanthan gum which results in the highly viscous gels is unique for these materials. In fact, this reaction and gel formation is used as a test for the determination and identification of locust bean gum as described in U.S. Food Chemical Codex II, page 856.

SUMMARY OF THE INVENTION

This invention pertains to derivatives of natural gums, particularly the phosphate ester of locust bean gum. More particularly, this invention relates to blends of phosphated locust bean gum and xanthan gum and to the viscous aqueous gels made from such blends.

By this invention phosphated locust bean gums are made which have a degree of substitution of about 0.03 to about 0.5 and, preferably, 0.07 to about 0.1. Such phosphated gums can be dissolved in cold water to form viscous sols. The phosphated locust bean gums are blended with xanthan gums in the range of 90 to 50 percent by weight phosphated locust bean gum to about 10 to 50 percent by weight xanthan gum. Such blends can be dissolved in cold water without high shear agitation to form viscous gels at concentrations of about 0.1 to about 2 percent by weight of the blend in water. Such aqueous gels have numerous uses as thickeners and suspending agents in foods, explosives, oil well slurriers and agricultural applications. These gels are particularly useful as suspending media for seeds in fluid drilling, precision planting processes.

DESCRIPTION OF THE INVENTION

Locust bean gum is derived from the seeds of the tree Ceratonia siliqua, or the carob tree. The carob, an evergreen that grows to 10 meters, produces pods 10–20 cm. long and 2–5 cm. wide. Pods are shaken from the trees and are transported to kibbling machines where the pods are broken open and the beans freed. The beans are soaked in water and then milled to remove the shell, release the germ, and free the endosperm for later grinding and sifting. The ground endosperm, milled as free of protein as possible is the commercial gum of industry. Locust bean gum is a galactomannan having a straight chain of mannose units with galactopyranose units attached to this linear chain. The ratio of galactose to mannose units varies from 1:3 to 1:6.

The phosphated locust bean gums of this invention are the esters of phosphoric acid and locust bean gum. From all indications these esters are the monoesters of phosphoric acid. The phosphated locust bean gums have a degree of substitution of about 0.03 to about 0.5 and, preferably, about 0.07 to about 0.1. The phosphatizing agent used in this invention is an alkali metal salt of ortho-phosphoric acid having a pH in an aqueous solution of about 6 to about 7 and, preferably, a pH of about 6.6 to about 6.7. Such phosphate salts can be made from the alkali metal hydroxide and phosphoric acid, from a mixture of the mono and di alkali metal salts of phosphoric acid, or from any combination of hydroxide, acid and salt which gives the desired pH. The alkali metal hydroxides are sodium, potassium and lithium hydroxide with sodium hydroxide being preferred. The phosphated locust bean gum is isolated from the reaction as a mixed alkali metal and hydrogen phosphate salt but can be converted to the complete salt by the addition of more alkali metal hydroxide or to the non-salt derivative by the addition of a mineral acid.

If sodium hydroxide and phosphoric acid are used as the phosphatizing agent then to 100 parts by weight of locust bean gum, are reacted 4 to 20 parts by weight of sodium hydroxide and 6–30 parts by weight of phosphoric acid in such relation to each other that the pH of an aqueous solution is about 6 to 7. A particularly preferred specific proportion of reactants is 10 parts by weight of sodium hydroxide and 14.7 parts of phosphoric acid, the pH being 6.6–6.7, for each 100 parts by weight of locust bean gum. The mono and di sodium salts of phosphoric acid are used in the molar ratio of 2:1 to 1:2, still within the limits as determined by the pH of 6–7. Such salts are used in the amount of about 8 to 40 parts by weight per 100 parts by weight of locust bean gum. When other alkali metal hydroxides or other combinations of hydroxides, salts and acid are used, the equivalent useful ranges can be readily calculated by those skilled in the art.

In carrying out the phosphatizing reaction of this invention, water must be present. The amount of water will vary from about 20 parts to about 100 parts by weight per 100 parts by weight of locust bean gum. This amount of water is the total amount of water mixed with the locust bean gum, which includes the water in the phosphatizing solution. This amount of water should be enough to homogeneously mix well with the gum, but should not be used in such amounts that excessive hydration and solubilities of the gum occurs. An organic liquid, preferably a water miscible one, e.g., methanol, ethanol and isopropanol, are used in the reaction to fluidize the reaction mass without dissolving it. At least about 20 parts by weight of the organic liquid are used per 100 parts by weight of the gum and, preferably, about 40 parts. There is no upper limit to the amount of organic liquid. However, to keep the reactor size within practical limits and to reduce the amount of liquid which must be recovered, this upper limit will be about 100 parts by weight per 100 parts of locust bean gum.

The phosphatizing reaction is conducted at a temperature of about 120° C. to about 180° C., and, preferably at about 150° C. to about 170° C. for a time sufficient to complete the phosphatization, generally about 30 minutes to about 4 hours. During the heating, the water and organic liquid are evaporated from the reactor. At the end of the reaction, the product can be ground if necessary and is sieved to remove or break up agglomerates. If desired, the product can be washed to remove salts.

The phosphatizing reaction can be conducted in a number of ways. The locust bean gum can be first mixed with water and aqueous alkali metal hydroxide, followed by the addition of phosphoric acid. The salt solution can be prepared first from the phosphate salts or alkali metal hydroxide and phosphoric acid, or other combinations as described hereinbefore. This salt solution with additional water if desired is then added to the gum. The dry sodium acid phosphate salts can be blended with the gum and water can then be added. The process can be conducted in air or under an inert gas, e.g., nitrogen blanket in the absence of free oxygen, if so desired. The water miscible organic liquid can be added to the reactor before, during, or after the other reactants have been added. The phosphatizing reaction can also be conducted in suspension wherein the locust bean gum is suspended in an organic liquid, e.g., cyclohexanone, and the reactants are added.

The xanthan gum used in this invention is a commercially available gum also known as Xanthomonas gum which is made by the fermentation of carbohydrates with bacterial of the genus Xanthomonas. Representative of these bacterial are Xanthomonas campestris, Xanthomonas phaseoli, Xanthomonas mulvacearn, Xanthomonas carotae, Xanthomonas translucens, Xanthomonas hederae and Xanthomonas papavericoli. The gum produced by the bacteria Xanthomonas campestris is preferred for the purpose of this invention. The fermentation usually involves inoculating a fermentable broth containing a carbohydrate, various minerals and a nitrogen yielding compound. Procedures for preparing the xanthan gums are described in detail in U.S. Pat. Nos. 3,557,016 and 4,038,206 which are hereby incorporated by reference.

The ratio of phosphated locust bean gum to xanthan gum of this invention can be varied over a wide range. The useful range is about 90 to about 50 parts by weight of phosphated locust bean gum to about 10 to about 50 parts by weight of xanthan gum, the total being 100 parts by weight. The preferred range of component are about 80 to about 70 parts by weight of phosphated locust bean gum to about 20 to about 30 parts by weight of xanthan gum, the total being 100 parts by weight.

Aqueous viscous liquid to firm gels are made from the blended phosphated locust bean gum and xanthan gum by simply adding the blended materials to water with gentle stirring and allowing the gums to hydrate. Viscosity increase is obtained almost immediately within 1 to 2 minutes. Full hydration as indicated by maximum viscosity is obtained in about 10 to 15 minutes. A usable gel is obtained within 5 to 60 minutes depending upon the applied concentration and the quality of the xanthan gum. In preparing such gels, it is preferred to first thoroughly blend the powdered phosphated locust bean gum and xanthan gum in the desired ratio and then to add it to the water as stated hereinbefore. These blends will disperse and hydrate in cold water with no need for heat or high sheer agitation. For easy handling and ready dispersibility, the gums should have a particle size of less than about 100 mesh (U.S. Standard Sieve Series). Other components, e.g., fillers, wetting agents, dispersants, bactericides, fungicides and the like, can be mixed with the powdered blends of this invention if so desired.

In some instances where less cohesive gels are needed or desired, small amounts up to as much as 50 weight percent of the total blend of other hydrocolloids, particularly cold water swellable ones, can be added. Examples of such hydrocolloids include guar gum, hydroxyethyl guar gum, hydroxyproxyl guar gum carboxymethyl guar gum, carboxymethyl-hydroxypropyl guar gum, carboxymethyl cellulose, hydroxyethyl cellulose, gum karaya, gum tragacanth, alginates, gum carageenan and the like.

The gels obtained by this invention are made by adding about 0.1 to about 2 weight percent, based on the weight of the gel, of the blend of phosphated locust bean gum and xanthan gum to water. The viscosity and/or firmness of the gel increases with increasing concentration. At low levels, 0.1 to about 0.5 weight percent, the gels are pumpable viscous liquids. Above these concentrations, the viscosity is such that the gels are no longer pumpable and above 1 weight percent are more or less firm, cohesive gels.

The gels obtained by this invention are particularly useful as suspending agents for various solids, e.g., cuttings produced in oil well drilling and propping agents used in oil well fracturing fluids. The gels are particularly useful in a precision planting process referred to as fluid drilling. In the fluid drilling process, pregerminated seeds are suspended in a liquid gel and are then pumped through a plant drilling device which accurately places the gelled liquid and the seeds in furrows in the earth. Accurate and precision spacing of the seeds is obtained if the seeds are evenly dispersed in the gel and if this dispersion is retained when pumped. Seeds, such as pregerminated rape seeds, soyabeans, carrot seeds, lettuce seeds and the like, can be evenly dispersed in the gels obtained by this invention and will not settle or move relative to each other. When agitated and pumped, the seeds retain these relative positions.

The following examples described the invention in detail. Parts and percentages, unless otherwise designated, are parts and percentages by weight.

EXAMPLE 1

To a suitable reactor equipped with a kneading type agitator were added 25 kgs. of locust bean gum flour and 10 liters of methanol. After blending for 5 minutes, 14.7 liters of an aqueous phosphate solution having a pH of 6.65 were added over a 5 minute period with the temperature rising to 38°–41° C. The aqueous phosphate solution was made from 6.5 liters of 30 weight percent solution of sodium hydroxide in water, 3.2 liters of 75 weight percent phosphoric acid in water and 5 liters of water. The mixture was blended for 30 minutes and was then introduced into a blender/drier equipped with a worm type agitator. The blender/drier contents were heated to 160° C. while evaporating off methanol and water and were held at 160° C. for 75 minutes. The product was then cooled and filled into bags.

The phosphated locust bean gum product swelled in water at 25° C. resulting in a viscosity of 400–500 cps. at 1% concentration in water. The purified product, i.e., the product washed free of salts, swelled in water at 25° C., resulting in a viscosity of 1,000 cps. In both cases, the viscosity after heating to 86° C. and cooling to 25°

C. was in the same range as the viscosity after swelling at 25° C.

Diluted solutions or dispersions of the phosphated locust bean gum, purified or unpurified, were flocculated by the addition of hexadecyl-trimethylammonium bromide indicating the anionic nature of the product.

Seventy-five parts of the phosphated locust bean gum were blended with 25 parts of xanthan gum. A portion of this blend sufficient to form a 0.2% solution in water, was added with stirring to water at room temperature. In less than 5 minutes a weak gel had formed. This gel was thin enough to be pumped yet it was strong enough to suspend pregerminated rape seeds with no settling or movement for 24 hours.

The addition of 2 parts of the 75/25 phosphated locust bean gum/xanthan gum blend to 98 parts of water at room temperature formed within five minutes a firm non-pumpable gel.

EXAMPLE 2

To a kneader type reactor were added 25 kgs. of locust bean gum flour followed by a solution of 6.5 liters of a 30 weight percent solution or sodium hydroxide in water and 5 liters of water. After thoroughly mixing, 3.2 liters of a 75% solution in water of phosphoric acid dissolved in 10 liters of methanol were added. The mass was thoroughly mixed and was heated to 150° C. for 3 hours while exaporating the methanol and solvent. The resulting product was then sieved and bagged. Aqueous solutions of the product exhibited anionic properties as evidenced by flocculation with hexadecyl-trimethyl ammonium bromide.

Blends of the phosphated locust bean gum with xanthan gum produced weak to firm gels in water at room temperature depending on the concentration of the gums.

EXAMPLE 3

To a suitable container were added 40 grams of locust bean gum flour and 20 ml. of an aqueous solution containing 4.15 g. of sodium hydroxide. After thoroughly mixing for five minutes, a solution of 7.15 grams of 85 weight percent phosphoric acid in water dissolved in 25 grams of methanol was added. Mixing was continued for 10 minutes. The container was then placed in a drying oven at 158° C. Samples were removed after heating for 1 hour, 1.5 hours, 2 hours and 2.5 hours. These samples were dissolved in water at 25° C. and after 30 minutes hydration, the viscosity was measured.

| Time, hrs. | Viscosity, cps. |
|---|---|
| 1 | 378 |
| 1.5 | 452 |
| 2 | 458 |
| 2.5 | 400 |

A blend was prepared from 75 parts of the phosphated locust bean gum and 25 parts of xanthan gum. A 0.4 percent solution of this mixture in water at room temperature formed a gel which could be pumped but which had sufficient gel structure to suspend soya beans for 24 hours with no settling.

EXAMPLE 4

To a suitable container were added 40 grams of locust bean gum flour and 20 ml. of methanol. After thoroughly mixing, 20 ml. of a sodium acid phosphate solution plus 20 ml. of water were added. The sodium acid phosphate solution was made from 103.75 grams of sodium hydroxide, 180 grams of phosphoric acid (85% in water) and 300 ml. of water. When thoroughly mixed, the container was placed in an oven heated to 103° C. for 60 minutes and then was placed in an oven heated at 160° C. Samples were removed after heating for 1 hour, 1 hour and 10 minutes, 1 hour and 20 minutes and 1 hour and 30 minutes. The samples were dissolved in water at 1% concentration at 25° C. After 60 minutes hydration, the viscosities were determined.

| Time | Viscosity, cps. |
|---|---|
| 1 hr | 420 |
| 1 hr, 10 min. | 476 |
| 1 hr, 20 min. | 512 |
| 1 hr, 30 min. | 530 |

It is to be understood that the foregoing detailed description is given merely by way of illustration and that many variations may be made therein without departing from the spirit of the invention.

What is claimed is:

1. A phosphated locust bean gum having a degree of substitution of about 0.03 to about 0.5.

2. The composition of claim 1 having a degree of substitution of about 0.07 to about 0.1.

3. A blend comprising about 90 to about 50 percent by weight phosphated locust bean gum having a degree of substitution of about 0.03 to about 0.5 and 10 to 50 percent by weight xanthan gum.

4. The composition of claim 3 wherein the phosphated locust bean gum has a degree of substitution of about 0.07 to about 0.1.

5. The composition of claim 3 wherein the phosphated locust bean gum is present in the amount of about 80 to about 70 percent by weight and the xanthan gum is present in the amount of about 20 to about 30 percent by weight.

6. The composition of claim 5 wherein the phosphated locust bean gum has a degree of substitution of about 0.07 to about 0.1.

7. A process for preparing a gel which comprises adding to water in the amount of about 0.1 to about 2 weight percent based on the weight of the gel a blend of 90 to 50 percent by weight phosphated locust bean gum having a degree of substitution of about 0.03 to about 0.5 and 10 to 50 percent by weight xanthan gum.

8. The process of claim 7 wherein the phosphated locust bean gum has a degree of substitution of about 0.07 to about 0.1.

9. The process of claim 7 wherein the phosphated locust bean gum is present in the amount of about 80 to about 70 percent by weight and the xanthan gum is present in the amount of about 20 to about 30 percent by weight.

10. The process of claim 9 wherein the phosphated locust bean gum has a degree of substitution of about 0.07 to about 0.1.

* * * * *